United States Patent [19]

Hamaguchi

[11] Patent Number: 4,925,231

[45] Date of Patent: May 15, 1990

[54] AIR CONDUCTING APPARATUS FOR A MOTORCYCLE

[75] Inventor: Kazumichi Hamaguchi, Asaka, Japan

[73] Assignee: Honda Giken Kogyo Kabushiki Kaisha, Tokyo, Japan

[21] Appl. No.: 288,830

[22] Filed: Dec. 23, 1988

[30] Foreign Application Priority Data

Dec. 26, 1987 [JP] Japan .................. 62-198216

[51] Int. Cl.⁵ .............................. B62J 17/00
[52] U.S. Cl. ................... 296/78.1; 296/208; 180/229; 280/304.3; 49/386; 98/1
[58] Field of Search ............ 296/78.1, 208, 92, 96; 180/229; 280/304.3; 49/386, 392; 98/1, 2.12, 2.13

[56] References Cited

U.S. PATENT DOCUMENTS 4,130,315 12/1978 Shields ............................. 296/78.1
4,479,676 10/1984 Hayes .............................. 296/78.1
4,536,005 8/1985 Tanaka et al. ................. 296/78.1 X
4,686,656 8/1987 Morishima ...................... 296/78.1 X Primary Examiner—Dennis H. Pedder
Assistant Examiner—Andrew C. Pike
Attorney, Agent, or Firm—Armstrong, Nikaido, Marmelstein, Kubovcik & Murray

[57] ABSTRACT

Footwardly directed air conduting apparatus mounted on an engine guard frame surrounding a cylinder head portion of a flat engine mounted in front of a step of a motorcycle. A cover is mounted on the engine guard and covers the cylinder head portion. At air guide plate is rotatably mounted in a window-like opening in the cover in such a manner that the forward end moves to the outside and the rearward end moves to the inside of the cover. An over-center spring mechanism is provided between the rearward end of the plate and the inside of the cover.

4 Claims, 3 Drawing Sheets

AIR CONDUCTING APPARATUS FOR A MOTORCYCLE

BACKGROUND OF THE INVENTION

The present invention relates to an air conducting apparatus for a motorcycle with a flat engine, and more particularly an apparatus for cooling an operator's foot by conducting fresh air thereto.

In a motorcycle with a flat engine, the engine cylinder head portion projects usually in front of a step for an operator. It brings about an uncomfortable condition in that the operator's foot receives heat from the running engine.

Several reasons contribute to the above-mentioned problem. The first reason is that the heat generating engine is located adjacent to the operator's foot. The second reason is that fresh air cannot be conducted to the operator's foot the operation or movement of the motorcycle because there generally is provided an engine guard pipe formed in a frame figure surrounding the engine cylinder head portion.

The object of the present invention is to present an air conducting apparatus for the motorcycle that during the movement of the motorcycle, fresh air can be forcefully conducted to and cool the operator's foot by making use of the engine guard construction.

SUMMARY OF THE INVENTION

In order to achieve the above-mentioned object, the present invention comprises a cover surrounding the engine head portion and mounted on the engine guard, which is formed in the frame figure and provided in front of the step, and in a window-like opening provided in the cover, there is mounted an air guide plate, the forward end and the rearward end of which are respectively mounted rotatably to the outside and the inside of the motorcycle.

As the guide plate is rotatably mounted as the forward end to the outside and the rearward to the inside, fresh air is forcefully conducted to the inside of the motorcycle through the cover window-like opening by means of the air guide plate. Therefore, the operator's foot on the step can be cooled.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
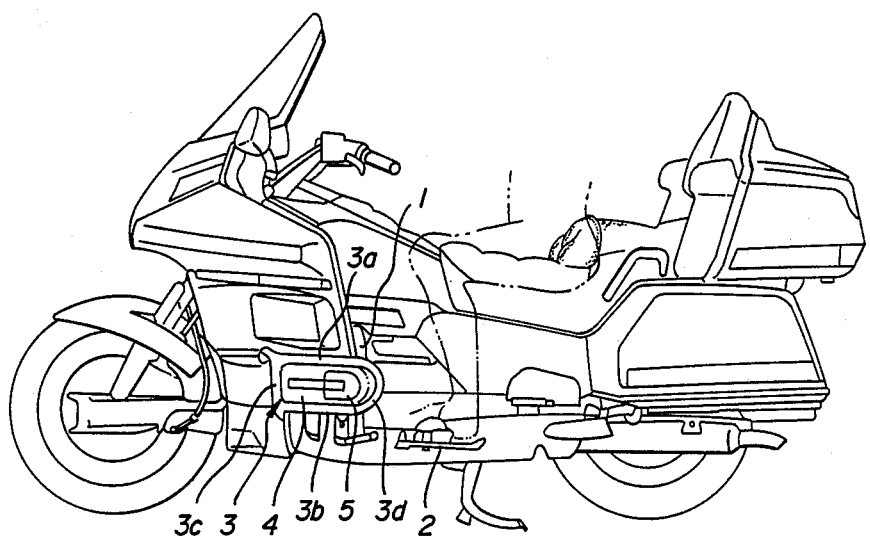
FIG. 1 is a side view of a motorcycle having a preferred embodiment of the present invention mounted thereon.
Figure 2:
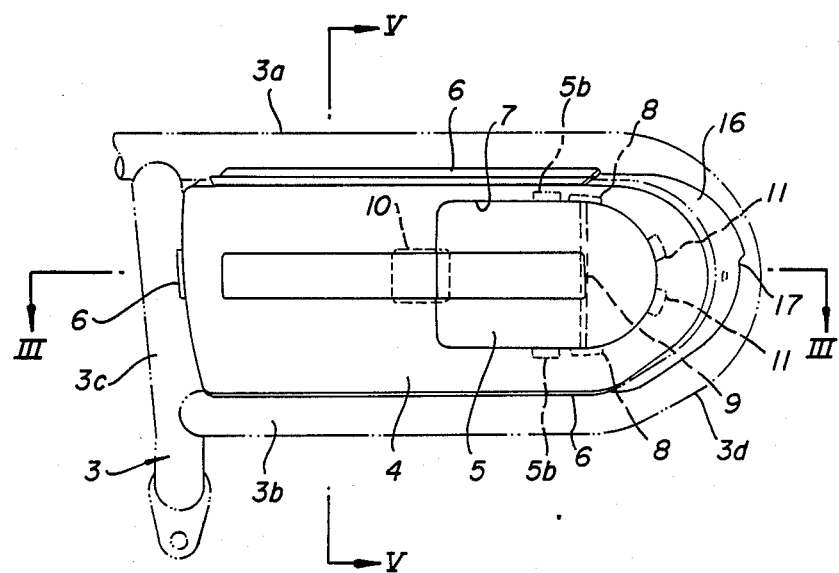
FIG. 2 is an enlarged view of the main part of the present invention.

A preferred embodiment of the present invention will be described referring to the drawings.

FIG. 1 shows an entire view of the motorcycle. The cylinder head portion 1a (see FIG. 6) of a flat multi-cylinder engine 1 projects in both body side directions in front of a step 2. An engine guard pipe 3 is provided surrounding the cylinder head portion. The engine guard pipe 3 is formed as a closed loop having an upper pipe 3a and a lower pipe 3b which are parallel to each other. The front pipe 3c is substantially vertical and the rear pipe 3d is curved connecting the ends of the upper pipe 3a and the lower pipe 3b.

A cover 4 is mounted along the inside circumference of the engine guard pipe 3. An air conducting apparatus is constituted by installing an air guide plate 5 in the cover 4.

FIGS. 2 to 7 show the detailed construction of the air conducting apparatus. The cover 4 is connected to the upper pipe 3a, the lower pipe 3b and the front pipe 3c through an intermediate element 6 which is made of a resilient material and is fitted around the outer circumference of the cover 4.

A longitudinal window-like opening 7 is formed in the rear portion of the cover 4. The air guide plate 5 is mounted in the opening 7. The air guide plate 5 has the configuration to be inserted in the window opening 7 and is swingingly mounted around a vertically oriented shaft 9 through a bracket 8 projecting inside the cover and an E-ring (not shown). In this manner, the forward and the rearward ends of the plate 5 are rotatable around the shaft 9 for the air guide plate 5 to open and to close the window opening 7.

A stopping element 10 is provided at the forward portion of an inner surface 4a of the cover 4. The forward end of the air guide plate 5 rotates outwardly in the direction indicated with the arrow A in FIG. 3 and the rearward end thereof rotates inwardly in the direction indicated with the arrow B.

An additional stopping element 11 is provided at the rearward end of the inner surface of the air guide plate 5. There are also provided a pair of additional stopping elements 5b at upper and the lower edges of said air guide plate 5.

The air guide plate 5 can be kept at each open position or a closed position by means of an over-center spring mechanism 12. An arm 13 is integrally fitted on the rearward end of the inner surface 5a of the air guide plate 5 by means of a fitting device 5c. The front tip of the arm 13 is connected to a compression spring 15 which is mounted to the rearward portion of the cover 4 by a bracket 14 fixed to the cover 4.

Figure 3:
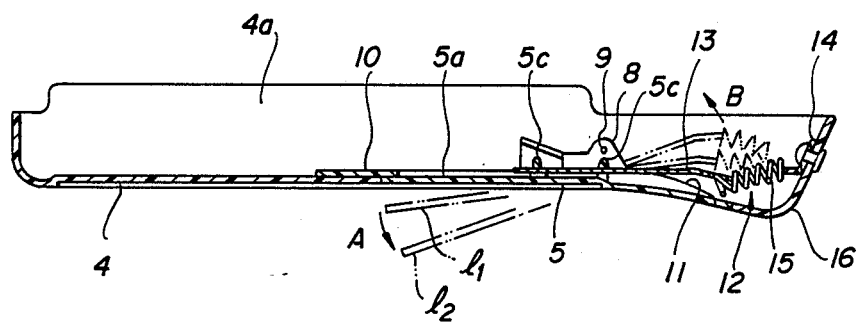
FIG. 3 is a sectional view along with line III—III of FIG. 2.
Figure 4:
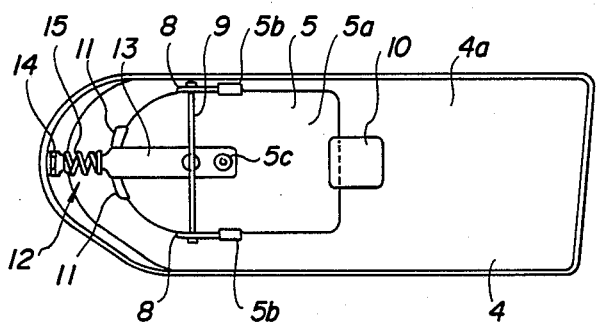
FIG. 4 is a rear view.
Figure 5:
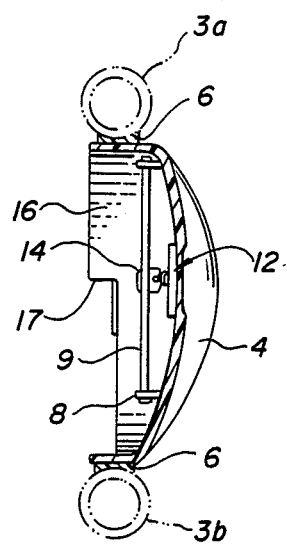
FIG. 5 is a sectional view along with line V—V of FIG. 2.

The compression spring 15 is arranged to bias the air guide plate 5 either in the direction indicated with arrows A and B or in the opposite direction to close the window opening 7 which is shown in FIG. 3 in solid line. That is, the front tip of the arm 13 and the bracket 14 are bent such that the spring 15 is maximally compressed at a neutral position of the plate 5 shown with dotted line $l_1$, and less compressed at the closed position (shown in solid line) and the open position (shown in dotted line $l_2$.) A frame portion 16, which is formed around the outer circumference of the cover 4 and projects inwardly, has a cut-out portion 17 at the low portion of the rear of the cover 4.

Figure 6:
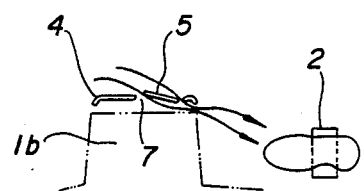
FIG. 6 is a partial diagrammatic plan view showing the operation of the present invention.
Figure 7:
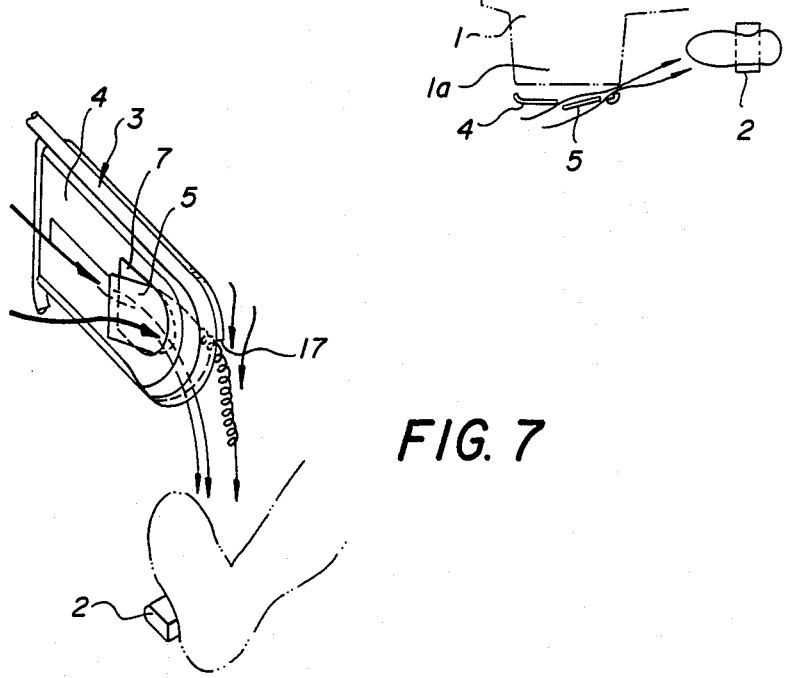
FIG. 7 is a partial perspective view showing the operation of the present invention.

During the operation of the motorcycle, the forward end of the air guide plate 5 is rotated outwardly and is kept at the open position by the spring device 12 so that fresh air is conducted inwardly through the window opening 7 to cool the operator's foot on the step as shown in FIG. 6. Fresh air is conducted downwardly by the function of the cut-out portion 17 of the frame 16, resulting in more fresh air conducted to the operator's foot to improve the cooling efficiency. As the cut-out portion 17 is provided only at the lower half portion of the cover, fresh air conducted into the interior portion of the cover 4 becomes turbulent and flows in the direction of the foot, resulting in that fresh air from above the frame 16 is also forced to the foot.

In the situation when fresh air is not desired, the air guide plate 5 is rotated to close the window opening 7. The air guide plate is kept closed by means of the over-center spring device 12, resulting in no fluttering thereof.

According to the present invention, a new air conducting apparatus is easily provided by only mounting a cover on an engine guard. It can improve driving comfort through cooling the operator's foot by forcefully conducting fresh air to the foot. The air conducting apparatus described above can be an aftermarket product and added to an existing engine guard of a motorcycle at any time.

It is readily apparent that the above-described invention has the advantage of wide commercial utility. It should be understood that the specific form of the invention hereinabove described is intended to be representative only, as certain modifications within the scope of these teachings will be apparent to those skilled in the art. Accordingly, reference should be made to the following claims in determining the full scope of the invention.

What is claimed is:

1. An air conducting apparatus for use on an engine guard formed in a frame of a motorcycle, in which the guard surrounds a cylinder head portion of an engine having a flat opposed cylinder configuration, with cylinder heads being disposed in front of foot steps of the motorcycle, said air conducting apparatus comprising:
    a cover mounted on the engine guard, said cover at least partially enclosing said cylinder head and having a window opening therein;
    an air guide plate disposed in said window opening and pivotable therein, such that in an opened position, a forward end of said plate is pivoted into an airstream on a side of the cover opposite from the cylinder head, and a rearward end of said plate is pivoted inward toward the cylinder head; and
    an over-center spring means, connected between said rearward end of said plate and said cover, for holding said plate in one of an opened position and a closed position.

2. The air conducting apparatus of claim 1, further comprising a stop means, positioned on said cover, for stopping movement of said plate in a closing direction beyond said closed position.

3. The air conducting apparatus of claim 1, further comprising a stop means, positioned on said plate, for stopping movement of said plate in a closing direction beyond said closed position.

4. In combination with a motorcycle having an engine guard formed in a frame thereof, in which the guard is generally parallel to a longitudinal direction of the frame and surrounds a cylinder head portion of an engine having a flat opposed cylinder configuration, the engine being generally aligned along the longitudinal direction of the frame, the cylinder heads being disposed in front of foot steps of the motorcycle, an air conducting apparatus comprising:
    a cover mounted on the engine guard, said cover at least partially enclosing said cylinder head and having a window opening located at a rear portion of said cover; and
    an air guide plate disposed in said window opening and pivotable therein, such that in an opened position, a forward end of said plate is pivoted into an airstream on a side of the cover opposite from the cylinder head, and a rearward end of said plate is pivoted inward toward the cylinder head.

* * * * *